(12) United States Patent
Mazaira et al.

(10) Patent No.: US 11,001,249 B2
(45) Date of Patent: May 11, 2021

(54) AUTOMATIC CUTOFF FOR VEHICLE OPERABLE AS GENERATOR

(71) Applicant: Ford Global Technologies, LLC, Dearborn, MI (US)

(72) Inventors: Jordan Mazaira, Taylor, MI (US); Joseph George, Canton, MI (US); Seth Anthony Bryan, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 494 days.

(21) Appl. No.: 15/920,567

(22) Filed: Mar. 14, 2018

(65) Prior Publication Data
US 2019/0283731 A1    Sep. 19, 2019

(51) Int. Cl.
| | | |
|---|---|---|
| *B60L 9/00* | (2019.01) | |
| *B60W 20/13* | (2016.01) | |
| *B60W 50/14* | (2020.01) | |
| *G06F 3/0484* | (2013.01) | |

(52) U.S. Cl.
CPC ............ *B60W 20/13* (2016.01); *B60W 50/14* (2013.01); *B60W 2050/143* (2013.01); *B60W 2050/146* (2013.01); *B60W 2510/244* (2013.01); *B60W 2710/086* (2013.01); *G06F 3/04847* (2013.01); *Y10S 903/906* (2013.01)

(58) Field of Classification Search
None
See application file for complete search history.

(56) References Cited

U.S. PATENT DOCUMENTS

| | | | |
|---|---|---|---|
| 4,902,956 A | 2/1990 | Sloan | |
| 5,204,991 A | 4/1993 | Law | |
| 6,753,625 B2 | 6/2004 | Kelsey | |
| 7,658,249 B2 | 2/2010 | Buglione et al. | |
| 8,606,443 B2 * | 12/2013 | Pandit | B60L 50/00 701/22 |
| 9,221,456 B2 | 12/2015 | Wright et al. | |
| 9,630,514 B2 * | 4/2017 | Ferrel | B60L 58/20 |
| 9,777,648 B2 * | 10/2017 | Umesaka | B60L 50/60 |
| 2008/0027639 A1 | 1/2008 | Ando | |

(Continued)

FOREIGN PATENT DOCUMENTS

EP     1104073 A3    3/2003

OTHER PUBLICATIONS

Honig, Paul. "Running Our House on Prius Power," Posted on Aug. 4, 2014. http://www.greenbuildingadvisor.com/blogs/dept/guest-blogs/running-our-house-on-prius-power.

(Continued)

*Primary Examiner* — Adam M Alharbi
(74) *Attorney, Agent, or Firm* — David B. Kelley; Carlson, Gaskey & Olds, P.C.

(57) ABSTRACT

A motor vehicle according to an exemplary aspect of the present disclosure includes, among other things, at least one power source. The motor vehicle is operable as a generator to supply power from the at least one power source to an auxiliary load. The motor vehicle also includes a controller configured to estimate a range of the motor vehicle based on a state of the at least one power source, and to command the motor vehicle to stop operating as a generator when the estimated range reaches a threshold range. A method is also disclosed.

27 Claims, 5 Drawing Sheets

(56) References Cited

U.S. PATENT DOCUMENTS

2009/0277702 A1* 11/2009 Kanada ................ B60W 10/26
                                                          180/65.29
2017/0274890 A1* 9/2017 Mansur ................ B60W 10/06

OTHER PUBLICATIONS

Phan, Patrick "Using a Hybrid Vehicle as a Generator," thegreenenergy website, Jul. 28, 2011. Also included, Sweeney, John. "Hybrid Car Powers Home During Blackout," Jan. 9, 2009. http://thegreenenergy.blogspot.com/2011/07/using-hybrid-vehicle-as-generator.

* cited by examiner

AUTOMATIC CUTOFF FOR VEHICLE OPERABLE AS GENERATOR

TECHNICAL FIELD

This disclosure relates to a motor vehicle operable as a generator and a corresponding method of use. In this disclosure, the vehicle is configured to automatically cutoff generator operation when an estimated vehicle range reaches a threshold range.

BACKGROUND

The need to reduce automotive fuel consumption and emissions is well known. Therefore, vehicles are being developed that reduce reliance on internal combustion engines. Electrified vehicles are one type of vehicle being developed for this purpose. In general, electrified vehicles differ from conventional motor vehicles in that electrified vehicles are selectively driven using one or more electric machines powered by a first power supply, namely a traction battery. The electric machines can drive the electrified vehicles instead of, or in addition to, a second power supply, such as an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicles can also operate as generators. When operating as a generator, the power supplies of the electrified vehicle supply power to one or more auxiliary loads, such as electrical equipment or the electrical loads of a residential home, as examples.

SUMMARY

A motor vehicle according to an exemplary aspect of the present disclosure includes, among other things, at least one power source. The motor vehicle is operable as a generator to supply power from the at least one power source to an auxiliary load. The motor vehicle also includes a controller configured to estimate a range of the motor vehicle based on a state of the at least one power source, and to command the motor vehicle to stop operating as a generator when the estimated range reaches a threshold range.

In a further non-limiting embodiment of the foregoing motor vehicle, the threshold range is expressed in units of distance.

In a further non-limiting embodiment of any of the foregoing motor vehicles, the motor vehicle includes a human-machine interface configured to receive an input setting the threshold range.

In a further non-limiting embodiment of any of the foregoing motor vehicles, the human-machine interface includes at least one of a touchscreen mounted inside the motor vehicle and a mobile device.

In a further non-limiting embodiment of any of the foregoing motor vehicles, the human-machine interface includes a slider bar adjustable to set the threshold range.

In a further non-limiting embodiment of any of the foregoing motor vehicles, the controller is configured to display an alert via the human-machine interface before the estimated range reaches the threshold range.

In a further non-limiting embodiment of any of the foregoing motor vehicles, the at least one power source includes at least one of a battery pack and an internal combustion engine.

In a further non-limiting embodiment of any of the foregoing motor vehicles, the motor vehicle is operable in a first mode to draw power from the at least one power source to drive the motor vehicle and in a second mode as a generator to supply power from the at least one power source to the auxiliary load.

In a further non-limiting embodiment of any of the foregoing motor vehicles, the human-machine interface is configured to receive an input setting an operating mode of the motor vehicle.

In a further non-limiting embodiment of any of the foregoing motor vehicles, the motor vehicle is an electrified vehicle and includes a battery pack, and the threshold range is expressed in terms of a state of charge of the battery pack.

In a further non-limiting embodiment of any of the foregoing motor vehicles, the motor vehicle includes an internal combustion engine, and the threshold range is expressed in terms of a level of fuel available to the internal combustion engine.

In a further non-limiting embodiment of any of the foregoing motor vehicles, the at least one power source includes both a battery pack and an internal combustion engine.

A method according to an exemplary aspect of the present disclosure includes, among other things, operating a motor vehicle as a generator by supplying power from at least one power source of the motor vehicle to an auxiliary load, estimating a range of the motor vehicle based on a state of the at least one source, and stopping the motor vehicle from operating as a generator when the estimated range reaches a threshold range.

In a further non-limiting embodiment of the foregoing method, the threshold range is expressed in units of distance.

In a further non-limiting embodiment of any of the foregoing methods, the method includes inputting the threshold range via a human-machine interface mounted inside the motor vehicle.

In a further non-limiting embodiment of any of the foregoing methods, the threshold range is input by sliding a slider bar on the human-machine interface.

In a further non-limiting embodiment of any of the foregoing methods, the method includes presenting an alert via the human-machine interface before the estimated range reaches the threshold range.

In a further non-limiting embodiment of any of the foregoing methods, the at least one power source includes at least one of a battery pack and an internal combustion engine.

In a further non-limiting embodiment of any of the foregoing methods, the motor vehicle is operable in a first mode to draw power from the at least one power source to drive the motor vehicle and in a second mode as a generator to supply power from the at least one power source to the auxiliary load.

In a further non-limiting embodiment of any of the foregoing methods, the at least one power source includes both a battery pack and an internal combustion engine.

BRIEF DESCRIPTION OF THE DRAWINGS

In FIG. 2, the electrified vehicle is configured for use as a generator and is electrically coupled to an auxiliary load.

DETAILED DESCRIPTION

This disclosure relates to a motor vehicle, such as an electrified vehicle, operable as a generator and a corresponding method of use. An example motor vehicle includes at least one power source. The motor vehicle is operable as a generator to supply power from the at least one power source to an auxiliary load. The motor vehicle further includes a controller configured to estimate a range of the motor vehicle based on a state of the at least one power source. The controller is further configured to command the motor vehicle to stop operating as a generator when the estimated range reaches a threshold range. In this way, the controller cuts off generator operation when the threshold range is reached, thereby preventing the at least one power source from being depleted and preserving a certain amount of vehicle range.

This disclosure has a number of benefits, which will be appreciated from a review of this disclosure. Among them, the vehicle can be used as a generator even when a user is remote from the vehicle, and the user has peace of mind that the vehicle will not run unabated and deplete the at least one power source. Further, the vehicle can be used as a generator even in remote locations, and the user will have confidence that a return trip can be made. Further still, in some embodiments of this disclosure the threshold range can be set by the user in terms of units of distance, which is intuitive for a user.

Figure 1:
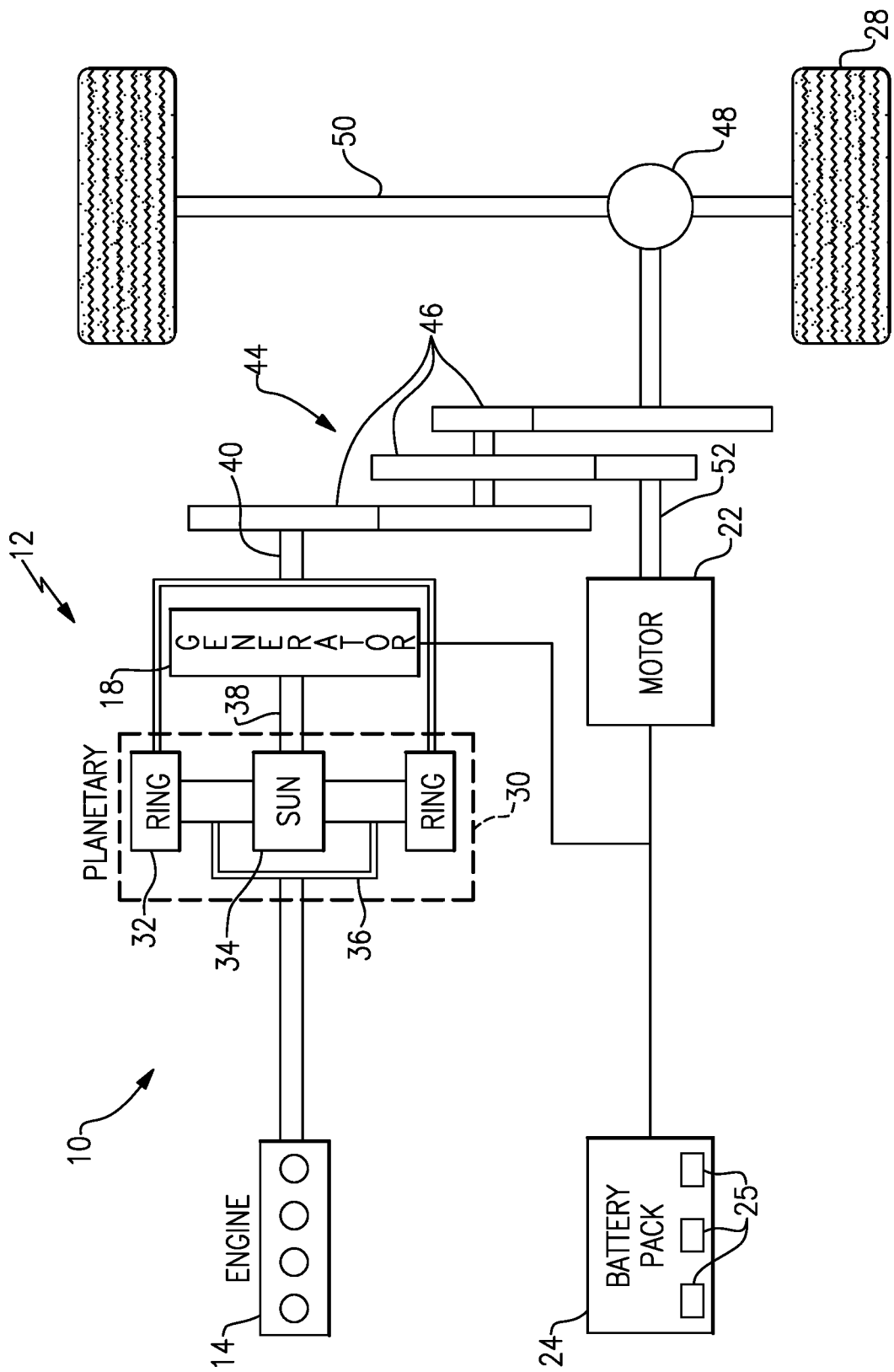
FIG. 1 schematically illustrates a powertrain of an electrified vehicle.

Referring to the drawings, FIG. 1 schematically illustrates a powertrain 10 for a motor vehicle, which in this example is an electrified vehicle 12. Although depicted as a hybrid electric vehicle (HEV), it should be understood that the concepts described herein are not limited to HEVs and could extend to other electrified vehicles, including, but not limited to, plug-in hybrid electric vehicles (PHEVs) and battery electric vehicles (BEVs). This disclosure also extends to conventional motor vehicles which rely exclusively on internal combustion engines.

In a non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids, micro hybrids, plug-in hybrids, and battery electric vehicles. This disclosure also extends to motor vehicles that are not electrified vehicles, including motor vehicles having only an internal combustion engine.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. In another example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12 via an electrical distribution system. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
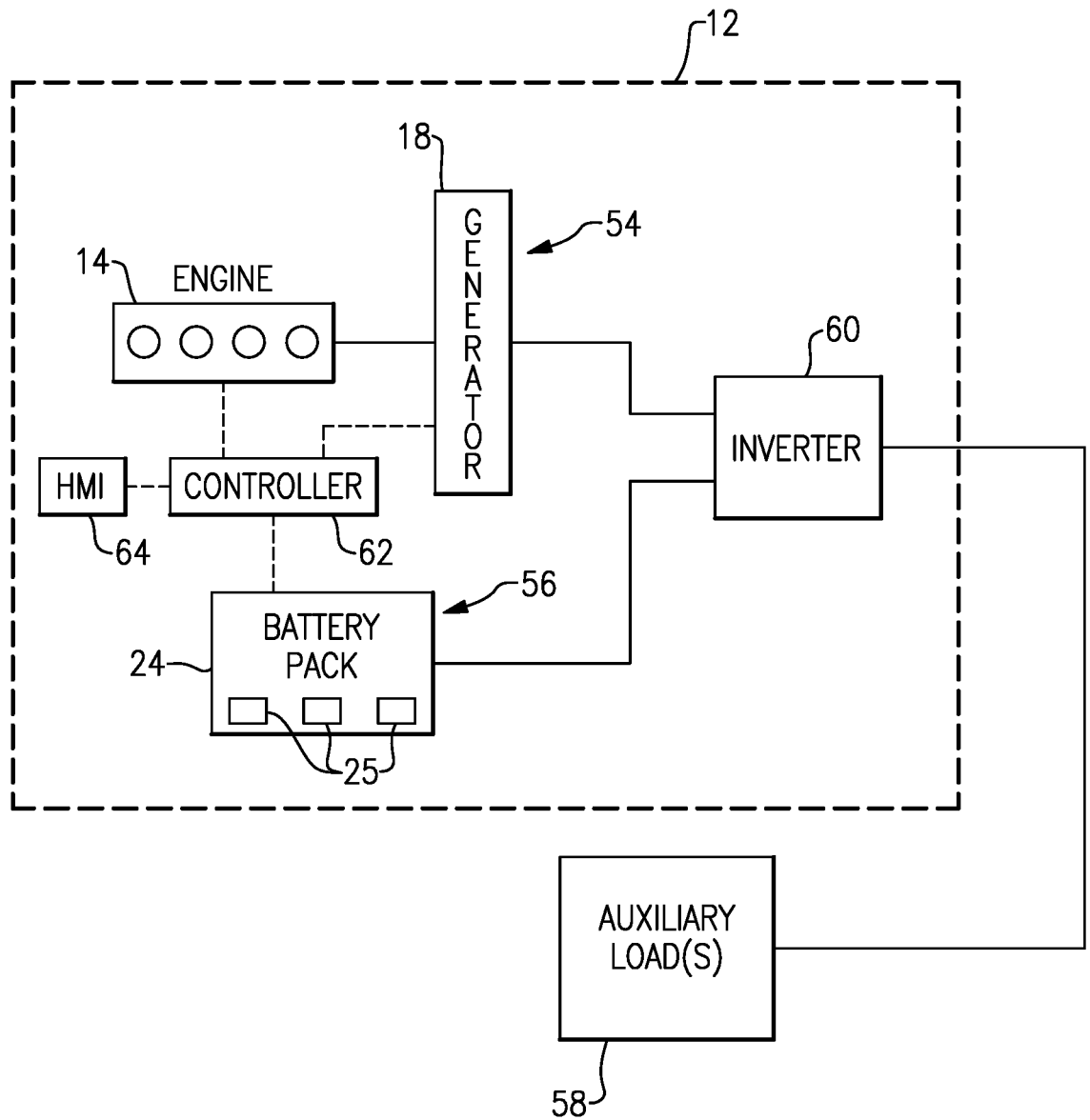
FIG. 2 schematically illustrates a portion of the powertrain of the electrified vehicle.

In addition to the two basic operating modes discussed above, the electrified vehicle 12 is also operable as a generator configured to supply power to one or more auxiliary loads. FIG. 2 schematically illustrates an arrangement of the electrified vehicle 12 when the electrified vehicle 12 is operating as a generator.

The electrified vehicle 12 includes at least one power source configured to power one or more auxiliary loads. In the example of FIG. 2, the electrified vehicle 12 includes two power sources. The first power source 54 is provided by a combination of the engine 14 and the generator 18. The second power source 56 is provided by the battery pack 24. The first and second power sources 54, 56 are each electrically coupled to an auxiliary load 58.

The auxiliary load 58 may be any type of electrical load, including electrical equipment, machinery, a residential home, a commercial property, etc. Given the mobility of the electrified vehicle 12, the electrified vehicle 12 can serve as a mobile generator, making it particularly useful for supplying power to field equipment used at remote worksites. This disclosure is not limited to any particular auxiliary load, however.

The first and second power sources 54, 56 are coupled to the auxiliary load 58 in parallel in this example, via an inverter 60. The inverter 60 is configured to convert direct current from the first and second power sources 54, 56 to alternating current. The electrified vehicle 12 does not require an inverter 60 in all examples. Further, while not shown, it should be understood that the first and second power sources 54, 56 are coupled to the auxiliary load 58 by way of one or more electrical cables and electrical connectors, as examples. To this end, the electrified vehicle 12 may include a port which the auxiliary load 58 may be plugged into. This disclosure is not limited to any particular arrangement for coupling the auxiliary load 58 to the first and second power sources 54, 56.

While two power sources are shown, it should be understood that the electrified vehicle 12 could include one or more power sources. To this end, this disclosure extends to vehicles that are not electrified vehicles. Further, while only one auxiliary load is shown, the electrified vehicle 12 may power additional auxiliary loads.

The first and second power sources 54, 56 are responsive to instructions from a controller 62, in this example. The controller 62 is shown schematically in FIG. 2. It should be understood that the controller 62 could be part of an overall vehicle control module, such as a vehicle system controller (VSC), or could alternatively be a stand-alone controller separate from the VSC. Further, the controller 62 may be programmed with executable instructions for interfacing with and operating the various components of the electrified vehicle 12, including but not limited to those shown in FIG. 2. The controller 62 additionally includes a combination of hardware and software, and specifically includes a processing unit and non-transitory memory for executing the various control strategies and modes of the vehicle system.

In this disclosure, the controller 62 is configured to receive one or more inputs from a user (i.e., a driver) of the electrified vehicle 12 via a human-machine interface (HMI) 64, which is electrically coupled to the controller 62. The inputs a user provides to the human-machine interface 64 are interpreted by the controller 62, which then executes operations consistent with the inputs. The human-machine interface 64 may be provided by any known type of human-machine interface, including by a mobile device, such as a smart phone, tablet, or computer. The human-machine interface 64 may also be provided by a touchscreen inside the electrified vehicle 12.

Figure 3:
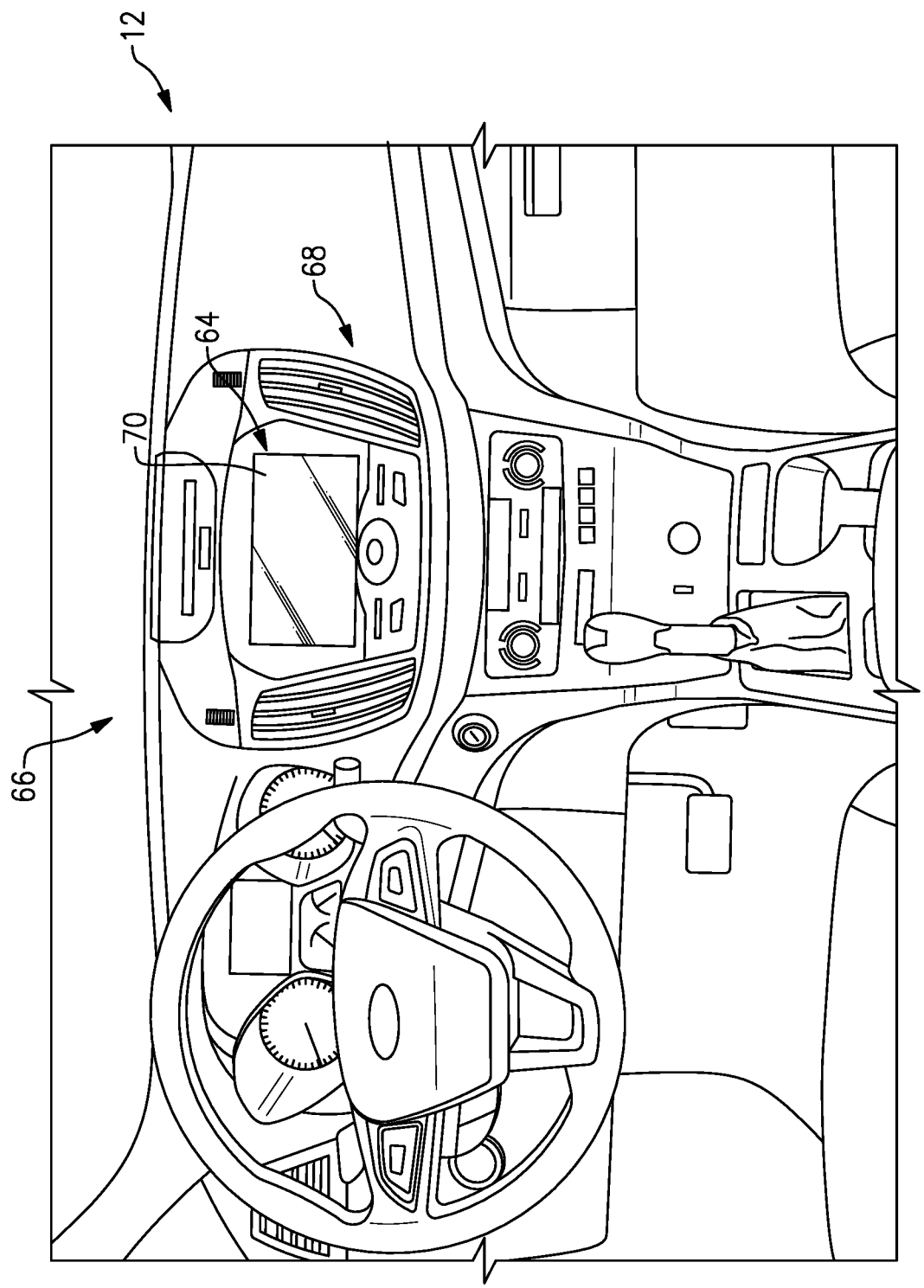
FIG. 3 illustrates a portion of an interior of an electrified vehicle, and in particular illustrates an example human-machine interface.

FIG. 3 illustrates one example human-machine interface 64, which is provided in a vehicle cabin 66, and is accessible by a user from within the electrified vehicle 12. In particular, FIG. 3 illustrates an in-vehicle infotainment (IVI) system 68. The in-vehicle infotainment system 68 includes the human-machine interface 64. The human-machine interface 64 may be an interactive display, such as a graphical user interface (GUI). In a particular example, the human-machine interface 64 includes a touchscreen 70 configured to display information to a user and allow the user to provide inputs by touching the touchscreen 70. While a touchscreen 70 is shown and described herein, this disclosure is not limited to touchscreens, and extends to other types of human-machine interfaces. One example human-machine interface 64 is provided, at least in part, by the SYNC® System available in vehicles sold commercially by Ford Motor Company.

As will be explained in detail below, the controller 62 is configured to automatically cutoff the electrified vehicle 12 from functioning as a generator. The user is allowed to set the point at which the controller 62 automatically cuts off the electrified vehicle 12 from functioning as a generator.

Figure 4:
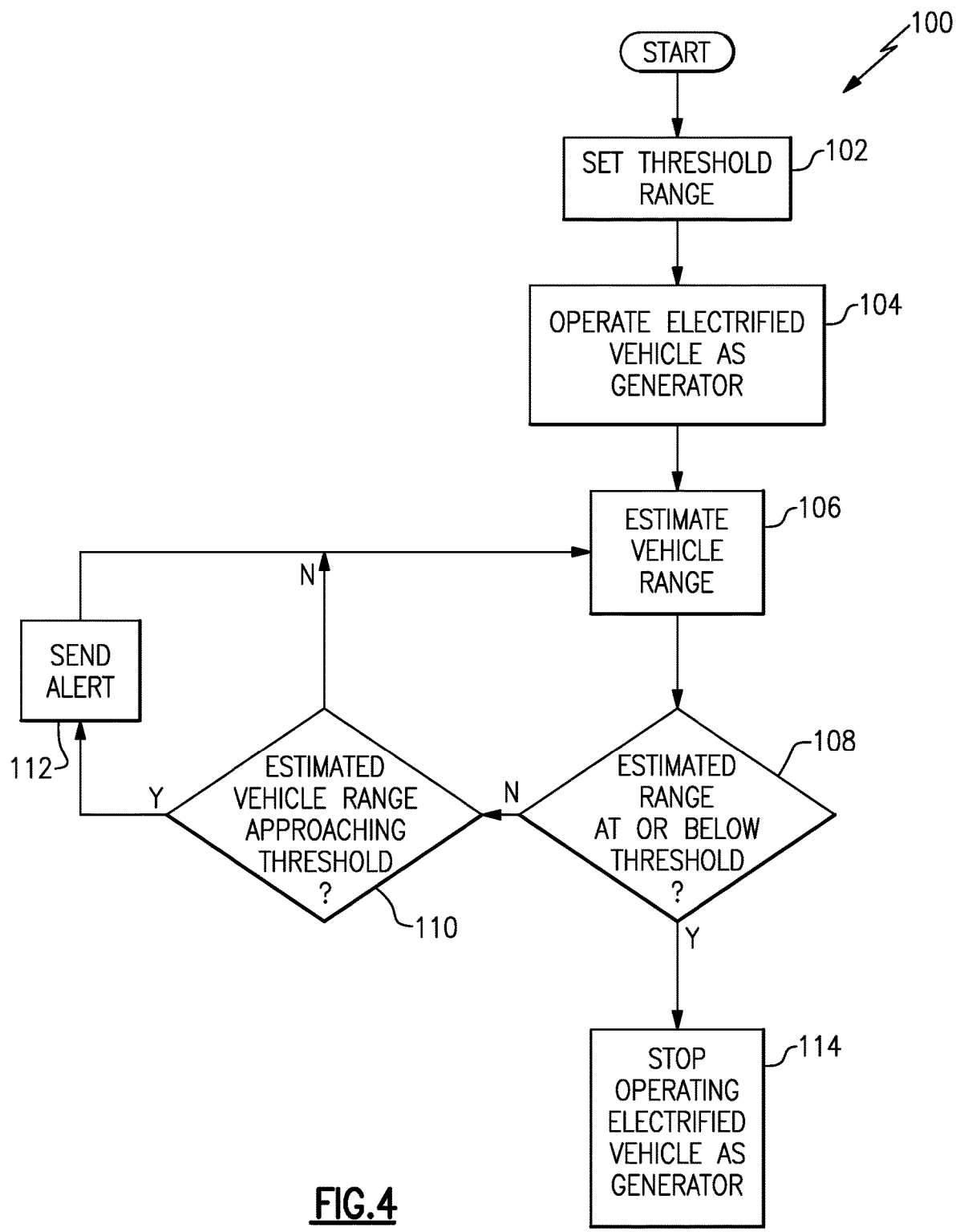
FIG. 4 is a flow chart representative of an example method according to this disclosure.

FIG. 4 is a flow chart representative of a method 100 according to this disclosure. In the method 100, the controller 62 selectively provides instructions to various components of the electrified vehicle 12 based on an input received via the human-machine interface 64. It should be understood that the method 100 will be performed by the controller 62 and other components of the electrified vehicle 12, such as those discussed above relative to FIGS. 1 and 2.

Beginning at step 102, a user sets a threshold range for the electrified vehicle 12. The threshold range is a minimum range that the user requires of the vehicle. The user may set the threshold range to correspond to an estimated distance from a worksite back to the user's home. For example, if the user lives 20 miles from a worksite where the electrified vehicle 12 is to be used as a generator, the user may set the threshold range at 20 miles, or a level substantially close to 20 miles accounting for some fluctuations, such as 25 miles. The threshold range is based on a remaining state of charge of the battery pack 24 and/or fuel that will remain available to the engine 14.

In some examples, the controller 62 recommends a threshold range to the user. For instance, if the controller 62 can determine that the user is a certain distance from their home or office, the controller 62 may recommend, via the human-machine interface, that the user set the threshold range to correspond to one of those distances. To this end, the controller 62 may receive information from a global positioning system (GPS). The controller 62 may also make threshold range recommendations based on a distance to the nearest gas station or publicly accessible charging station, as examples.

Figure 5:
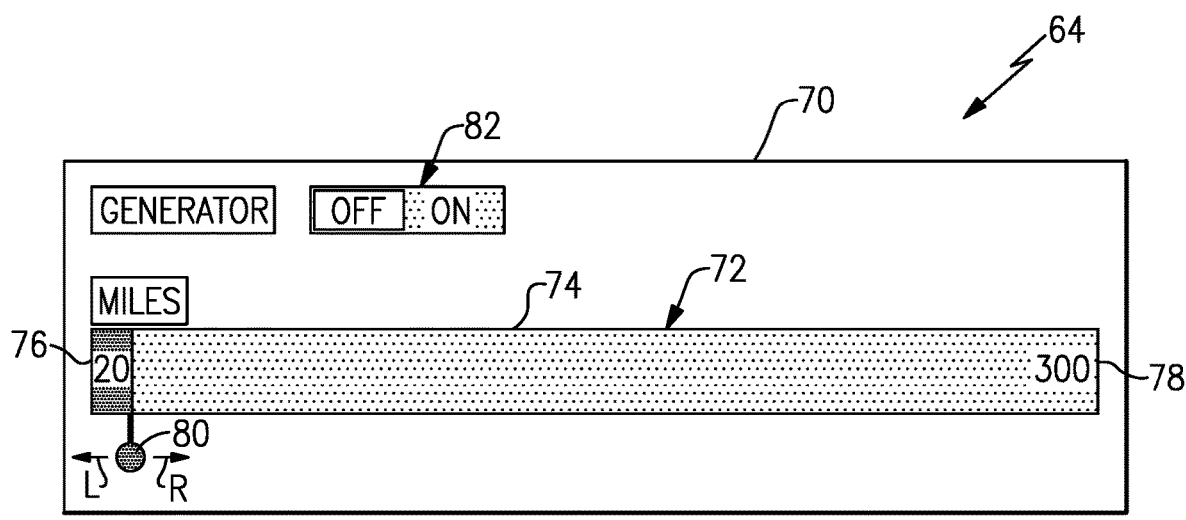
FIG. 5 illustrates an example configuration of the human-machine interface.

In one example, the user sets the threshold range via the human-machine interface 64. FIG. 5 illustrates one example configuration for the human-machine interface 64. Specifically, FIG. 5 illustrates an example configuration of the touchscreen 70. In this example, the touchscreen 70 includes a slider bar 72 having a bar 74 extending generally from a first end 76 near the left-hand side of the touchscreen 70 to a second end 78 near the right-hand side of the touchscreen 70. The slider bar 72 includes a slider 80, which is a button moveable between the first and second ends 76, 78 in the left and right directions L, R respectively.

The first end 76 of the bar 74 corresponds to a minimum vehicle range, which is a range of zero, wherein the battery pack 24 is fully depleted with a state of charge (SOC) of zero and wherein no fuel is available to the engine 14. The second end 78 of the bar corresponds to a maximum vehicle range, which may be on the order of 300 miles (about 480 km). In FIG. 5, the number "300" is displayed adjacent the second end 78 to indicate the maximum vehicle range.

The user is able to move the slider 80 to any point between the first and second ends 76, 78 along the bar 74 to set the threshold range. The user may also move the slider 80 to the ends 76, 78. In this example, the user has set the slider 80 substantially adjacent the first end 76 to set the threshold range at 20 miles (about 32 km). The number "20" is displayed to the user adjacent the slider 80, as shown in FIG. 5, to indicate the selected threshold range. While a slider bar 72 is shown in FIG. 5, this disclosure is not limited to slider bars 72. The user may input the threshold range in other ways.

In this disclosure, the threshold range is expressed in terms of distance, such as miles or kilometers. Expressing the threshold range in terms of miles is intuitive for most users in the United State of America, while users in other countries may find units of kilometers more intuitive. Regardless, most users know generally how far they need to drive, and the controller 62 can interpret a distance-based threshold range input when determining how much power to conserve. Alternatively, the threshold range could be expressed in terms of state of charge (SOC) of the battery pack 24, or in terms of fuel available to the engine 14. Some users may find it more intuitive to think of the threshold range in terms of a percentage of the battery remaining, or an amount of fuel left in a fuel tank.

Continuing on with the method 100, after the threshold range is set, the electrified vehicle 12 is operated as a generator, at 104, to supply power to the auxiliary load 58. The electrified vehicle 12 may be commanded to operate as a generator by the controller 62, which receives an input from the human-machine interface 64. In the example configuration of FIG. 5, the touchscreen 70 includes a toggle switch 82, allowing a user to turn the generator mode on and off, as desired.

In some examples, the controller 62 is configured to cause the auxiliary load 58 to preferentially draw power from the battery pack 24 before drawing power from the engine 14. In other examples, the opposite is true. In still other examples, the controller 62 causes the auxiliary load 58 to draw power from both power sources 54, 56 in parallel. The user may select the preferred power source in some examples, and in other examples the controller 62 is programmed in a factory setting to draw power from the power sources 54, 56 in a particular manner.

It should be noted that the order of steps 102 and 104 may be reversed. Further, the threshold range could be updated at any point throughout the method 100. Further still, the user may override the method 100 at any point using the toggle switch 82.

As the electrified vehicle 12 supplies power to the auxiliary load 58, the controller 62 continually estimates the remaining vehicle range, at 106. The controller 62 estimates the range of the electrified vehicle 12 based on a state of the first and second power sources 54, 56, in this example. For example, the controller 62 is programmed with lookup tables, equations, and the like, to correlate an amount of fuel in a fuel tank and/or an SOC of the battery pack 24 to an estimated vehicle range. The controller 62 may also factor in road and weather conditions, among other factors.

During operation, the controller 62 compares the estimated vehicle range to the threshold range, at 108. If the estimated vehicle range, determined at 106, is above the threshold range, the electrified vehicle 12 continues to operate as a generator, unless a user turns the switch 82 to the "OFF" position, for example.

As the first and second power sources 54, 56 continue to supply power to the auxiliary load 58, however, the estimated vehicle range will drop and begin to approach the threshold range. At 110, if the estimated vehicle range is within a margin of the threshold range, such as 10 miles (about 16 km), then an alert will be sent to the user, at 112. The alert may be sent via the human-machine interface 64, which again may include a touchscreen 70 and/or a user's smartphone, as examples. In the example where the user set a threshold range of 20 miles, the user may receive an alert text message and/or notification on the touchscreen 70 when the estimated vehicle range is 30 miles. The alert may indicate that the first and second power sources 54, 56 are becoming depleted and/or that the electrified vehicle 12 will soon stop operating as a generator. This disclosure is not limited to margins of 10 miles, and extends to other margins. This disclosure also extends to methods that do not send alerts.

When the estimated vehicle range reaches the threshold range, the controller 62 commands the electrified vehicle 12 to stop operating as a generator, at 114. In this disclosure, the term reaches means "less than or equal to." Thus, when the estimated vehicle range is less than or equal to the threshold range, the electrified vehicle 12 stops operating as a generator. In the example of FIG. 2, when the estimated vehicle range reaches the threshold range, the controller 62 commands the first and second power sources 54, 56 to stop supplying power to the auxiliary load 58. For example, the controller 62 may send a command to shut off the engine 14 and also send a command to open a switch between the battery pack 24 and the auxiliary load 58. In this way, the controller 62 automatically cuts off operation of the vehicle as a generator, thereby preserving the threshold range, which allows the user to drive the vehicle for the threshold range after using it as a generator.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   at least one power source, the motor vehicle operable as a generator to supply power from the at least one power source to an auxiliary load; and a controller configured to estimate a range of the motor vehicle based on a state of the at least one power source, and wherein, when the motor vehicle is operated as a generator at a remote location, the controller is configured to command the motor vehicle to stop operating as a generator when the estimated range reaches a threshold range corresponding to a range required for the motor vehicle to complete a return trip from the remote location.

2. The motor vehicle as recited in claim 1, wherein the threshold range is expressed in units of distance.

3. The motor vehicle as recited in claim 1, further comprising:
a human-machine interface configured to receive an input setting the threshold range.

4. The motor vehicle as recited in claim 3, wherein the human-machine interface includes at least one of a touchscreen mounted inside the motor vehicle and a mobile device.

5. The motor vehicle as recited in claim 4, wherein the human-machine interface includes a slider bar adjustable to set the threshold range.

6. The motor vehicle as recited in claim 4, wherein the controller is configured to display an alert via the human-machine interface before the estimated range reaches the threshold range.

7. The motor vehicle as recited in claim 1, wherein the at least one power source includes at least one of a battery pack and an internal combustion engine.

8. The motor vehicle as recited in claim 7, wherein the motor vehicle is operable in a first mode to draw power from the at least one power source to drive the motor vehicle and in a second mode as a generator to supply power from the at least one power source to the auxiliary load.

9. The motor vehicle as recited in claim 8, wherein the human-machine interface is configured to receive an input setting an operating mode of the motor vehicle.

10. The motor vehicle as recited in claim 7, wherein:
the motor vehicle is an electrified vehicle and includes a battery pack, and
the threshold range is expressed in terms of a state of charge of the battery pack.

11. The motor vehicle as recited in claim 7, wherein:
the motor vehicle includes an internal combustion engine, and
the threshold range is expressed in terms of a level of fuel available to the internal combustion engine.

12. The motor vehicle as recited in claim 7, wherein the at least one power source includes both a battery pack and an internal combustion engine.

13. A method, comprising:
driving a motor vehicle to a remote location;
operating the motor vehicle as a generator at the remote location by supplying power from at least one power source of the motor vehicle to an auxiliary load;
estimating a range of the motor vehicle based on a state of the at least one source; and
stopping the motor vehicle from operating as a generator when the estimated range reaches a threshold range; and
driving the motor vehicle on a return trip from the remote location after operating the motor vehicle as a generator at the remote location, wherein the threshold range corresponds to a range required for the motor vehicle to complete the return trip.

14. The method as recited in claim 13, wherein the threshold range is expressed in units of distance.

15. The method as recited in claim 13, further comprising:
inputting the threshold range via a human-machine interface mounted inside the motor vehicle.

16. The method as recited in claim 15, wherein the threshold range is input by sliding a slider bar on the human-machine interface.

17. The method as recited in claim 15, further comprising:
presenting an alert via the human-machine interface before the estimated range reaches the threshold range.

18. The method as recited in claim 13, wherein the at least one power source includes at least one of a battery pack and an internal combustion engine.

19. The method as recited in claim 18, wherein the motor vehicle is operable in a first mode to draw power from the at least one power source to drive the motor vehicle and in a second mode as a generator to supply power from the at least one power source to the auxiliary load.

20. The method as recited in claim 18, wherein the at least one power source includes both a battery pack and an internal combustion engine.

21. The motor vehicle as recited in claim 1, wherein the auxiliary load is independent of the motor vehicle.

22. The motor vehicle as recited in claim 21, wherein the auxiliary load is one of a piece of field equipment used at a remote worksite, electrical equipment, machinery, a residential home, and a commercial property.

23. The method as recited in claim 13, wherein the auxiliary load is one of a piece of field equipment used at a remote worksite, electrical equipment, machinery, a residential home, and a commercial property.

24. The motor vehicle as recited in claim 10, wherein, when the motor vehicle is operable as a generator, the controller commands the battery pack to supply power to the auxiliary load until the state of charge of the battery pack has depleted such that estimated range reaches the threshold range.

25. The method as recited in claim 13, wherein the step of operating the motor vehicle as a generator is performed when a user is remote from the motor vehicle.

26. The motor vehicle as recited in claim 1, wherein the remote location is a worksite.

27. The motor vehicle as recited in claim 1, wherein the return trip is a trip from a worksite to a home of a user of the motor vehicle.

* * * * *